(12) United States Patent
Fiebig (10) Patent No.: US 11,628,612 B2
(45) Date of Patent: Apr. 18, 2023

(54) DEVICE FOR PRODUCING PLASTIC PIPE

(71) Applicant: Unicor GmbH, Haβfurt (DE)

(72) Inventor: Christian Fiebig, Bamberg (DE)

(73) Assignee: Unicor GmbH

( * ) Notice: Subject to any disclaimer, the term of this patent is extended or adjusted under 35 U.S.C. 154(b) by 0 days.

(21) Appl. No.: 17/065,968

(22) Filed: Oct. 8, 2020

(65) Prior Publication Data

US 2021/0107208 A1 Apr. 15, 2021

(30) Foreign Application Priority Data

Oct. 9, 2019 (DE) .......................... 102019127168.1

(51) Int. Cl.
  *B29C 53/30* (2006.01)
  *B29C 48/13* (2019.01)
  *B29C 48/00* (2019.01)

(52) U.S. Cl.
  CPC .......... *B29C 53/30* (2013.01); *B29C 48/0019* (2019.02); *B29C 48/13* (2019.02)

(58) Field of Classification Search
  CPC ..... B29C 53/30; B29C 48/13; B29C 48/0019; B29C 49/00; B29C 33/36; B29C 47/00; B29C 45/16; B29C 45/27
  See application file for complete search history.

(56) References Cited

U.S. PATENT DOCUMENTS

| 4,492,551 A | 1/1985 | Hegler et al. |
| 4,988,466 A | 1/1991 | Jarvenkyla |
| 5,256,346 A | 10/1993 | Feuerherm |
| 10,279,536 B2 | 5/2019 | Lupke et al. |
| 2008/0088047 A1* | 4/2008 | Trudeau .................. B29C 45/84 264/328.14 |

(Continued)

FOREIGN PATENT DOCUMENTS

| AT | 75995 T | 5/1992 |
| CN | 110170558 A | 8/2019 |
| DE | 4017612 A1 | 12/1991 |

(Continued)

OTHER PUBLICATIONS

European Search Report for EP20199249.2 dated Mar. 15, 2021; 5 pages.

*Primary Examiner* — Jeffrey M Wollschlager
*Assistant Examiner* — Shibin Liang
(74) *Attorney, Agent, or Firm* — Lerner David LLP (57) ABSTRACT

The invention relates to a device for producing plastic pipe from a molten plastic tube. The device comprises a injection head for connection to an extruder for the extrusion of the molten plastic tube and several molding jaws in each case having a molding surface for the molding of the extruded molten plastic tube, which, for molding the extruded molten plastic tube, are arranged, in each case in pairs, guided by means of a drive device along a molding path in the production direction of the extruded molten plastic tube. The molding surface in each case partially encircles a receiving space for receiving the molten plastic tube. According to the invention, at least one of the molding jaws has a sensor device which comprises at least one sensor with a data-capturing sensor head, which is arranged such that its capture area comprises an area of the molding surface and/or an area of the receiving space.

25 Claims, 5 Drawing Sheets

(56) References Cited

U.S. PATENT DOCUMENTS

2017/0157820 A1* 6/2017 Ward .................... B29C 45/164
2017/0217074 A1* 8/2017 Lupke ................... B29C 48/303

FOREIGN PATENT DOCUMENTS

| DE | 102007038404 A1 | 2/2009 |
| EP | 0065729 B1 | 3/1984 |
| GA | 2461442 A1 | 9/2005 |
| JP | 3392195 B2 | 3/2003 |

* cited by examiner

DEVICE FOR PRODUCING PLASTIC PIPE

CROSS REFERENCE TO RELATED APPLICATION

The present application claims priority from German Patent Application No. 102019127168.1, filed on Oct. 9, 2019, the disclosure of which is hereby incorporated herein by reference.

TECHNICAL FIELD

The invention relates to a device for producing preferably corrugated plastic pipe from a molten plastic tube. Such a device is usually called a corrugator.

BACKGROUND

Use of sensors for measuring production parameters in a corrugator or in an extruder for the extrusion of a molten plastic tube arranged upstream of such a corrugator is known from the state of the art:

European patent EP 0 065 729 B1 describes a temperature sensor arranged fixed in position in a frame of a corrugator for measuring the temperature of molding jaws going past the frame.

Canadian patent application CA 2 461 442 A1 describes the arrangement of sensors in the area of the discharge nozzle device in the injection head of an extruder arranged upstream of a corrugator. The sensors are an ultrasonic sensor for measuring a flow rate in the injection head in conjunction with a temperature sensor and a pressure sensor.

German patent application DE 10 2007 038 404 A1 describes a corrugator with sensors for position determination.

The Austrian translation E 75 995 B of European patent specification EP 0 352 255 B1 describes a corrugator with a pressure sensor.

German patent application DE 40 17 612 404 A1 describes a device for the extrusion of plastics with pressure sensors.

BRIEF SUMMARY

According to the state of the art the quality of the plastic pipe can be checked only after the plastic pipe has been produced, for example by removing a test sample. Ensuring the quality of the plastic pipe according to the state of the art is therefore complex.

The object of the present invention is to eliminate the disadvantages from the state of the art. In particular, a device for producing preferably corrugated plastic pipe is to be provided, in which a high quality of the plastic pipe to be produced can be ensured. Furthermore, a molding jaw to be used in the device, a molding jaw pair formed of two such molding jaws and a method for producing preferably corrugated plastic pipe are to be specified.

According to the invention, this object is achieved in terms of the device with the subject-matter of claim 1, is achieved in relation to the molding jaw with the subject-matter of claim 20, is achieved in relation to the molding jaw pair with the subject-matter of claim 21 and is achieved in terms of the method with the subject-matter of claim 23. In addition, advantageous designs of the invention are specified in each case in the dependent claims.

According to the invention, the device for producing preferably corrugated plastic pipe from a molten plastic tube comprises
an injection head for connection to an extruder, wherein the injection head is provided with a discharge nozzle device for the extrusion of the molten plastic tube, and
several molding jaws in each case having a molding surface for the preferably corrugated molding of the extruded molten plastic tube.

The molding surface is preferably concave. The molding surface preferably forms a negative mold for a corrugated molding of the extruded molten plastic tube to produce corrugated plastic pipe. For this purpose, the molding surface preferably encloses half the circumference of the extruded molten plastic tube. The molding surface preferably has a substantially half cylinder-shaped extent and a corrugated surface. The corrugations provided on the surface are preferably designed such that corrugation peaks and corrugation valleys extend in each case in the circumferential direction of the molding surface. The corrugation peaks and corrugation valleys therefore extend in each case perpendicular to a longitudinal direction which runs parallel to a cylinder axis defined by the half cylinder-shaped extent.

For molding the extruded molten plastic tube the molding jaws are arranged, in each case in pairs, guided by means of a drive device along a molding path in the production direction of the extruded molten plastic tube. The molding jaws are furthermore arranged returned by means of the drive device in a return device. The molding jaws guided in pairs along the molding path, with their molding surfaces facing each other, form a receiving space for receiving the molten plastic tube.

The molding jaws preferably form a continuous chain. The individual molding jaws preferably have the same dimensions in each case, in particular the same height, same length and same width.

Within the meaning of the present invention, the terms molten plastic tube and plastic pipe are in most cases understood to be synonymous. The molten plastic tube is preferably continuously cooled and molded by the molding jaws. In the course of this process the molten plastic tube turns into the plastic pipe. Along the molding path an intermediate state therefore arises, which is optionally denoted by the terms molten plastic tube and/or plastic pipe.

The device furthermore preferably has a cooling mandrel, attached centrally to the injection head, for cooling the extruded molten plastic tube. The extruded molten plastic tube preferably surrounds the centrally arranged substantially cylindrical cooling mandrel, in that the molten plastic tube is guided along the molding path on the outer surface of the cooling mandrel.

According to the invention, at least one of the molding jaws has a sensor device which comprises at least one sensor with a data-capturing sensor head. Several, particularly preferably all, molding jaws provided in the device preferably in each case have a sensor device.

Capturing data by means of the sensor head is preferably based on measuring physical variables or on detecting a state.

The sensor head is arranged such that its capture area comprises an area of the molding surface and/or an area of the receiving space.

The arrangement according to the invention of the sensor head enables data of the molten plastic tube to be captured. As a result, the data can preferably be captured in situ during the production of the plastic pipe. Here, in particular physical variables of the molten plastic tube are measured and/or a state of the molten plastic tube is detected.

Within the meaning of the present invention, by the "capture area" of a sensor head is meant the spatial volume in which or from which the sensor head captures data. In the case of a thermocouple consisting of a pair of conductors connected at a junction, the capture area is for example the junction, i.e. the sensor head itself. In the case of an ultrasonic sensor, by contrast, the capture area is at a distance from the sensor head.

The device according to the invention for producing preferably corrugated plastic pipe therefore makes an in-process monitoring of the properties of the molten plastic tube possible. The data capture is advantageously effected in situ. The monitoring is advantageously effected in real time. This therefore enables a more precise understanding of the shaping process of the molten plastic tube or of the plastic pipe. In particular, process parameters can be adapted in a timely manner and in situ. As a result, the shaping process can be optimized. In particular, a high quality of the plastic pipe to be produced can thereby be ensured.

The sensor device preferably comprises several sensors with in each case a data-capturing sensor head. Several identical sensors and/or different sensors can be provided. For linguistic simplification, in the following description the term sensor or sensor head is usually used in the singular. The features described can in each case be formed with several sensors or several sensor heads of a sensor device provided on the at least one molding jaw. Furthermore, a sensor device can have several sensors or sensor heads with in each case—at least to some extent—different features. A multiplication and/or combination of the following features described for one sensor or sensor head is therefore hereby expressly provided in view of the presence of several sensors or several sensor heads.

The sensor head can be arranged such that it comes into direct contact with the molten plastic tube to be molded. This thus involves a contacting measurement and/or contacting detection of the molten plastic tube. In this case, the sensor head can also be referred to as a "probe tip". The sensor head is preferably in contact with the molding surface. The sensor head can in particular be arranged flush with the molding surface. The sensor head preferably forms an even, substantially smooth structure with the molding surface.

Alternatively, a contactless measurement and/or contactless detection of the molten plastic tube can be effected. In this case, the sensor head is not in contact with the molding surface, but rather is arranged recessed behind the molding surface, for example. The sensor head can be arranged, for example, in a blind hole and in the process can be at a distance from the molding surface or from the receiving space through material of the molding jaw. In these cases, however, the capture area of the sensor head preferably also reaches as far as the molding surface and/or into the receiving space, i.e. in particular as far as the molten plastic tube. To put it simply, the sensor "looks"—if necessary through material of the molding jaw—as far as the molding surface or into the receiving space, i.e. in particular as far as the molten plastic tube.

According to the invention, a molding jaw for producing a preferably corrugated plastic pipe from a molten plastic tube is furthermore claimed, wherein the molding jaw is formed as a molding jaw, having the sensor device, of the device according to the invention.

The molding jaw according to the invention has a molding surface for the preferably corrugated molding of the extruded molten plastic tube. Furthermore, the molding jaw according to the invention has a sensor device which comprises at least one sensor with a data-capturing sensor head, which is arranged such that its capture area comprises an area of the molding surface and/or an area of the receiving space.

Preferred embodiments of the molding jaw according to the invention can have the features dealt with above.

According to the invention, the molding jaw pair is formed of two molding jaws according to the invention such that the two molding surfaces of the two molding jaws in each case having the sensor device complement each other, forming a substantially cylindrical inner surface. The two molding jaws forming the molding jaw pair preferably abut against each other with their respective inner surfaces.

The two molding jaws according to the invention forming the molding jaw pair are preferably identical or a mirror image of each other. Alternatively, a molding jaw pair can be formed of differently designed molding jaws according to the invention.

Furthermore, a molding jaw pair can be formed of one molding jaw according to the invention and one conventional molding jaw.

According to an advantageous design of the invention, several sensor heads, in particular several sensor heads of ultrasonic sensors, are arranged at a distance from each other distributed over the entire circumference of the inner surface in each case in the area of the molding surface and in each case in the circumferential direction.

The two molding jaws forming the molding jaw pair preferably have a corresponding arrangement in each case, preferably an identical arrangement of the sensor heads. The sensor heads are preferably arranged such that adjacent sensor heads are in each case at the same distance from each other in the circumferential direction. In particular, several sensor heads of ultrasonic sensors can be arranged in each case at the same distance from each other in the circumferential direction as adjacent sensor heads. For example, four ultrasonic sensors can be provided on the molding jaw pair such that adjacent sensor heads are at an angle of 90° to each other. Six ultrasonic sensors can be provided such that adjacent sensor heads are in each case at an angle of 60° to each other. Eight ultrasonic sensors can be provided such that adjacent sensor heads are in each case at an angle of 45° to each other. Ten ultrasonic sensors can be provided such that adjacent sensor heads are in each case at an angle of 36° to each other. Twelve ultrasonic sensors can be provided such that adjacent sensor heads are in each case at an angle of 30° to each other.

By providing several ultrasonic sensors with the sensor heads arranged at a distance from each other in the circumferential direction it is possible to determine a progression and/or a distribution of the wall thickness of the molten plastic tube to be molded and/or of the plastic pipe in the circumferential direction.

According to the invention, the method for producing preferably corrugated plastic pipe in a device according to the invention comprises the following steps:
  guiding the extruded molten plastic tube along the molding path with the at least one molding jaw having the sensor device, and in the meantime:
  capturing the state of the molten plastic tube in situ in the molding path formed by the molding jaws by means of the sensor device.

The state of the molten plastic tube can for example comprise data on the temperature of the molten plastic tube, on the pressure and/or vacuum surrounding the molten plastic tube, on the point in time at which the molten plastic tube detaches from the molding surface. The data are determined by the sensor device by means of the sensor or by means of the sensors. For example, a thermocouple for determining the temperature of the molten plastic tube, a pressure sensor for determining the pressure or vacuum surrounding the molten plastic tube and/or a capacitive sensor for determining the point in time at which the molten plastic tube detaches from the molding surface can be provided as sensor and/or as sensors.

The method according to the invention for producing preferably corrugated plastic pipe makes an in-process, in-situ capture of measurement data possible. As a result, the properties of the molten plastic tube to be molded can be monitored in process. The monitoring is advantageously effected in real time. As a result, an immediate reaction to established undesired properties or disruptions is advantageously possible. This furthermore enables a more precise understanding of the shaping process of the molten plastic tube or of the plastic pipe.

In particular, process parameters can be reliably measured and the state of the molten plastic tube to be molded can be reliably determined with the method according to the invention. A high quality of the plastic pipe to be produced can thereby be ensured.

According to an advantageous design of the invention, during the guiding of the extruded molten plastic tube and/or of the plastic pipe along the molding path with the at least one molding jaw having the sensor device, the method additionally comprises the following step:

adapting process parameters based on the state of the molten plastic tube and/or plastic pipe captured in situ.

The process parameters preferably comprise a rate of advance of the molten plastic tube and/or plastic pipe, a vacuum surrounding the molten plastic tube and/or the plastic pipe and/or an internal air pressure, a cooling water flow rate through the molding jaws, a cooling water temperature, melt temperature, a temperature control and/or heating intensity of the pipes or lines for setting a viscosity of the plastic, an extruder rotational speed, an extruder temperature, a centering of the discharge nozzle of the injection head and/or a size of the nozzle gap of the discharge nozzle.

The process parameters can advantageously be adapted in a timely manner and in situ. As a result, the shaping process of the molten plastic tube can be optimized.

Advantageously, the process parameters can be adapted, for example, such that the detachment of the molten plastic tube from the molding surface is effected as late as possible, that is to say the point in time of detachment is as late as possible in the process management. Adhesion of the molten plastic tube to the molding surface for as long as possible is desirable because of the high heat transfer. The efficiency of the cooling of the molten plastic tube by the molding jaw can thus be maximized by delaying the point in time of detachment. For example, to influence the point in time of detachment the vacuum surrounding the molten plastic tube and/or the internal air pressure can be adapted.

The following preparatory steps are preferably carried out:
continually extruding a molten plastic tube with the injection head of the extruder,
fitting the molding surface of the molding jaw onto the extruded molten plastic tube preferably to be molded corrugated.

In the process the extruded molten plastic tube preferably to be molded corrugated is preferably enclosed by the cylindrical inner surface of the molding jaw pair formed by the two molding surfaces.

BRIEF DESCRIPTION OF THE DRAWINGS

The invention is now explained in more detail with reference to embodiment examples. There are shown in.

DETAILED DESCRIPTION

Figure 1A:
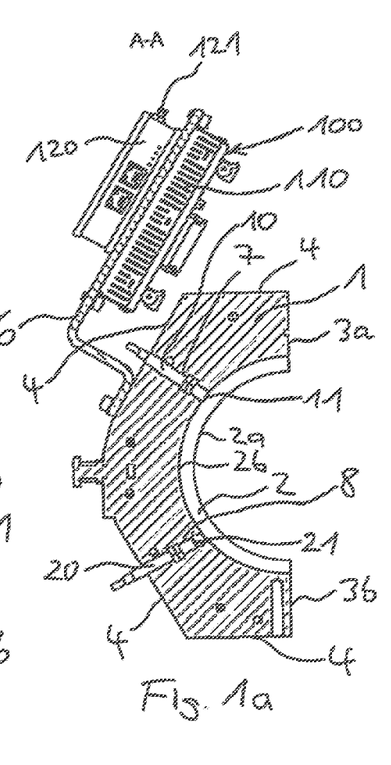
FIG. 1a a sectional representation of a first molding jaw according to the invention, FIG. 1b a view of inner surfaces of the first molding jaw according to the invention, FIG. 1c a view of a connection surface of the first molding jaw according to the invention, FIG. 1d a detailed view of FIG. 1c, FIG. 2a a view of inner surfaces of a second molding jaw according to the invention, FIG. 2b a view of a connection surface of the second molding jaw according to the invention, FIG. 3a a view of outer surfaces of a third molding jaw according to the invention, FIG. 3b a view of inner surfaces of the third molding jaw according to the invention, FIG. 3c a view of a connection surface of the third molding jaw according to the invention, FIG. 3d a detailed view of FIG. 3c, FIG. 4a a sectional representation of a fourth molding jaw according to the invention, FIG. 4b a view of inner surfaces of the fourth molding jaw according to the invention, FIG. 4c a view of a connection surface of the fourth molding jaw according to the invention, FIG. 5 a schematic representation of a device according to the invention for producing plastic pipes comprising an extruder with an injection head with discharge nozzle device and a corrugator with molding jaws driven in a circulating manner.
Figure 1B:
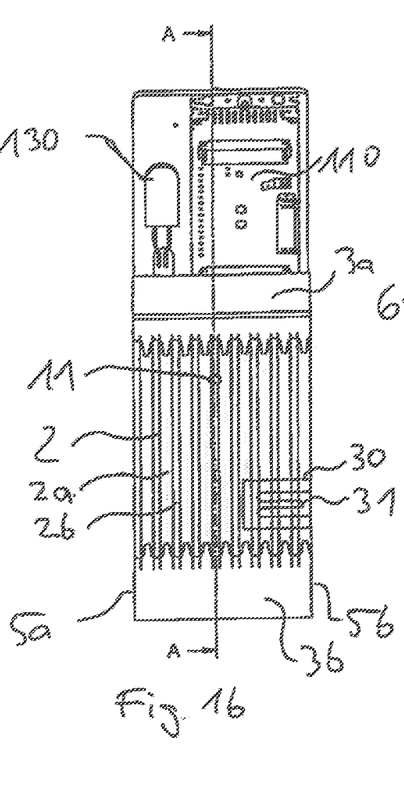

FIG. 1a shows a sectional representation of a first molding jaw 1 according to the invention. FIG. 1b in addition shows a view of the molding jaw 1 from the sectional representation of FIG. 1a starting from the right-hand side. The section used in FIG. 1a is again effected along the section line A-A drawn in in FIG. 1b.

The molding jaw 1 has a concave molding surface 2 with a substantially half cylinder-shaped extent and a corrugated surface. The corrugations provided on the surface are preferably designed such that corrugation peaks 2a and corrugation valleys 2b extend in each case in the circumferential direction of the molding surface. The corrugation peaks 2a and corrugation valleys 2b therefore extend in each case perpendicular to a longitudinal direction which runs parallel to a cylinder axis defined by the half cylinder-shaped extent.

The molding jaw 1 is designed, in a device for producing corrugated plastic pipe, i.e. in a so-called corrugator K, to mold a molten plastic tube KS, which is extruded from an injection head SK connected to an extruder ET, corrugated. The molding surface 2 forms a negative mold for the corrugated molding of the molten plastic tube KS. In the process, the molding surface 2 encloses half the circumference of the extruded molten plastic tube. The molding jaw 12 is arranged paired with a further molding jaw 1 and forms a molding jaw pair with the latter. The further molding jaw can be identical to or a mirror image of the molding jaw 1.

The molding surface 2 of the further molding jaw 1 encloses the remaining half of the circumference of the extruded molten plastic tube KS.

The molding jaws 1 are guided in pairs, i.e. as molding jaw pairs, arranged one behind the other along a molding path F in the production direction R of the extruded molten plastic tube KS. The molding jaws guided in pairs along the molding path, with their molding surfaces facing each other, form a receiving space for receiving the molten plastic tube. By applying the molding surfaces 2 of the molding jaw pairs to the extruded molten plastic tube a corrugated plastic pipe KR is produced from the extruded molten plastic tube.

The molding jaw 1 furthermore has two flat inner surfaces 3a, 3b, which adjoin the molding surface 2 on both sides. The inner surfaces 3a, 3b extend, like the molding surface 2, in the longitudinal direction, i.e. in the axial direction or parallel to the cylinder axis defined by the half cylinder-shaped extent of the molding surface 2. In other words, the inner surfaces 3a, 3b extend perpendicular to the sectional plane used in FIG. 1a. To form a molding jaw pair, the two molding jaws forming the molding jaw pair lie with their respective inner surfaces 3a, 3b abutting such that the two molding surfaces of the two molding jaws complement each other, forming a substantially cylindrical inner surface.

Figures 1C, 1D:
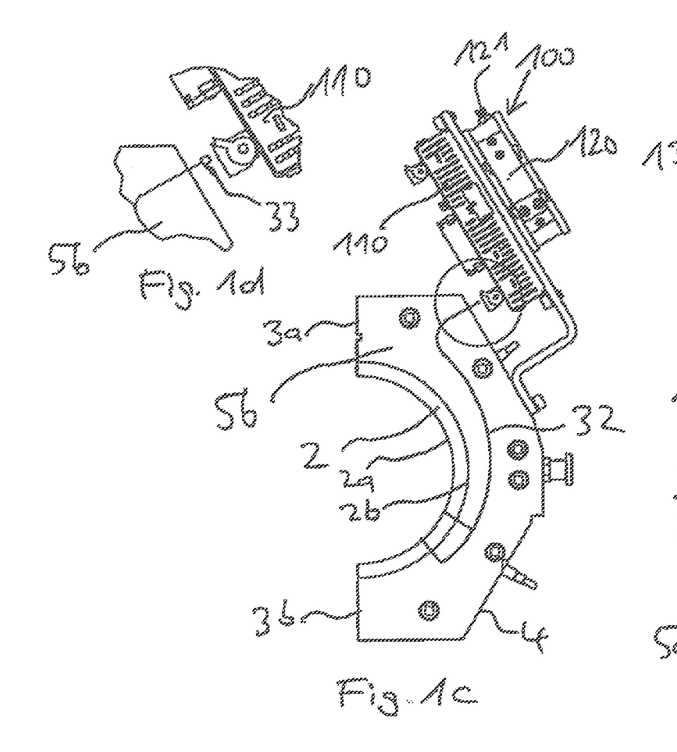

The molding jaw 1 furthermore has several outer surfaces 4 running in the longitudinal direction, i.e. perpendicular to the sectional plane used in FIG. 1a, and two connection surfaces 5a, 5b lying opposite each other. FIG. 1c in addition shows a view of the connection surface 5b.

The connection surfaces 5a, 5b run parallel to the sectional plane used in FIG. 1a, i.e. they extend perpendicular to the longitudinal direction. Along the molding path, adjacent molding jaw pairs are arranged such that the molding jaws involved follow each other directly with their corresponding connection surfaces abutting.

The first molding jaw 1 according to the invention has a sensor device with several sensors. In the example of the first molding jaw 1 according to the invention, the sensors are a temperature sensor 10, an ultrasonic sensor 20 and a capacitive sensor 30. The sensor device furthermore comprises an assembly 100. The assembly 100 contains, as individual components, a data acquisition device 110, a W-LAN module 120 and a power supply device 130. The assembly 100 or components of the assembly 100 are attached to a bracket 6 designed as an angle bracket. The individual components of the assembly 100 are attached to the bracket 6 in each case using attachment means, in particular using screws and/or adhesives. The bracket 6 is attached to one of the outer surfaces 4 of the molding jaw 1 using attachment means, in particular using screws and/or adhesives.

The first molding jaw 1 according to the invention furthermore has a drilled hole 7 and a blind drilled hole 8. The drilled hole 7 reaches through the molding jaw 1 from one of the outer surfaces 4 right through the molding surface 2. The blind drilled hole 8 penetrates the molding jaw 1 starting from one of the outer surfaces 4 in the direction of the molding surface 2, but without breaking through the molding surface 2. A material thickness of from 1 to 20 mm preferably remains between the blind drilled hole 8 and the molding surface 2. A material thickness of 5 mm particularly preferably remains.

The temperature sensor 10 is received in the drilled hole 7 such that its sensor head 11 is arranged in the area of the molding surface 2. The sensor head 11 is preferably arranged flush with the molding surface 2, in particular in a corrugation valley 2b of the molding surface 2. The sensor head 11 of the temperature sensor 10 thus contacts the molten plastic tube to be molded and in the process measures its temperature. The sensor head 11 is preferably surrounded laterally by a thermal insulation (not represented), with the result that the measurement of the temperature of the molten plastic tube is not distorted by the temperature of the molding jaw 1.

The ultrasonic sensor 20 is received in the blind drilled hole 8 such that its sensor head 21 is arranged behind the molding surface 2 at a distance from the molding surface 2. The sensor head 21 of the ultrasonic sensor 20 is preferably arranged behind a corrugation valley 2b of the molding surface 2. A material thickness of from 1 to 20 mm, particularly preferably of 5 mm, remains between the sensor head 21 and the molding surface 2. The ultrasonic sensor 20 thus performs a contactless measurement of the molten plastic tube. For this purpose, the ultrasonic sensor 20 emits ultrasound and receives the ultrasound reflected by the molten plastic tube. Through an evaluation of the signal of the ultrasonic sensor 20 the wall thickness of the molten plastic tube can in particular be determined.

The temperature sensor 10 and the ultrasonic sensor 20 are in each case connected to the data acquisition device 110 via a connection cable not represented in the figures.

The capacitive sensor 30 is imprinted on the molding surface 2 and has a layer thickness of approximately 0.05 mm. The capacitive sensor 30 clings to the molding surface 2 such that it follows the course of the molding surface 2 with its corrugation peaks 2a and corrugation valleys 2b. The capacitive sensor 30 comprises a sensor head 31. The sensor head 31 essentially forms a capacitor, the capacitance of which is influenced by matter present in its immediate surroundings. It can therefore be established by means of the capacitive sensor 30 imprinted on the molding surface 2 whether or not the molten plastic tube is in contact with the molding surface 2. Through ongoing evaluation of the signal of the capacitive sensor 30 the point in time at which the molten plastic tube detaches from the molding surface 2 can thus be determined. The capacitive sensor 30 is connected to the data acquisition device 110 via an imprinted cabling 32. As shown in FIG. 1c, for this purpose the imprinted cabling 32 runs on the connection surface 5b. The imprinted cabling 32 has a layer thickness of approximately 0.05 mm. It is evident from the detailed view shown in FIG. 1d that the imprinted cabling 32 leads to a plug 33. A connection cable (not represented) inserted into the plug 33 completes the connection of the capacitive sensor 30 to the data acquisition device 110.

By providing the temperature sensor 10 and the capacitive sensor 30 it is also possible, in addition to the point in time of detachment, to determine a detachment temperature, i.e. the temperature at which the molten plastic tube loses contact with the molding surface 2.

The data acquisition device 110 processes the data captured by the sensors. For this purpose, the data acquisition device 110 can comprise a data processing device and/or a data storage device.

The W-LAN module 120 can be designed as part of a data transmission device and can in particular form a second section of the data transmission device. The W-LAN module 120 is connected to the data acquisition device 110 for example via a connection cable (not represented) and furthermore has an antenna 121. The W-LAN module 120 receives data from the data acquisition device 110 and sends them to a control system (not represented) by means of the antenna 121. A further processing of the data takes place in the control system.

The power supply device 130 preferably comprises a battery, in particular a rechargeable battery or a storage battery. The power supply device 130 is connected to the data acquisition device 110 and the W-LAN module 120 with supply lines. The supply lines are not represented in the figures.

Figure 2A:
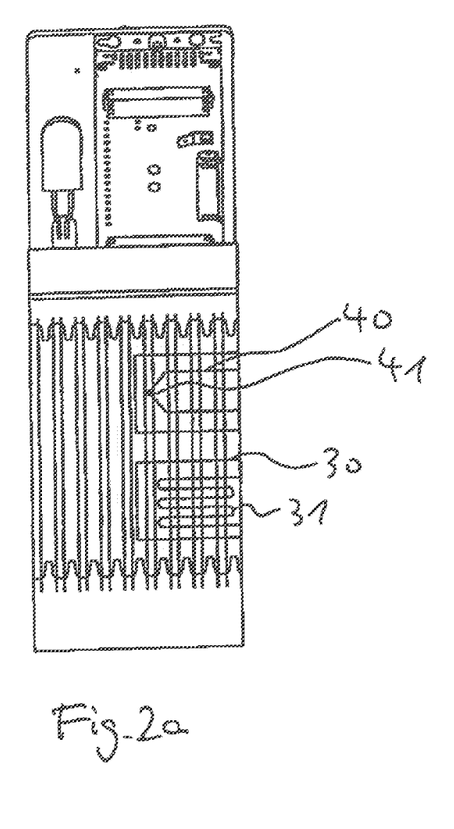
Figure 2B:
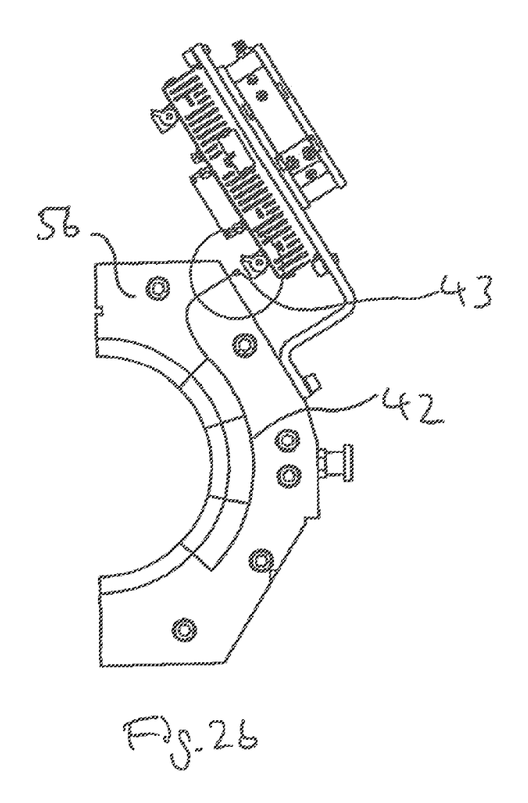

FIG. 2a and FIG. 2b show a second molding jaw 1 according to the invention. The second molding jaw 1 according to the invention substantially corresponds to the first molding jaw 1 according to the invention. A repetition of the common features is therefore dispensed with. Only the features of the second molding jaw 1 according to the invention which differ from the first molding jaw 1 according to the invention are described below.

Unlike the first molding jaw 1 according to the invention, the second molding jaw 1 according to the invention has no drilled hole and no blind drilled hole. The second molding jaw 1 according to the invention has only two sensors, which are both imprinted on the molding surface 2. The capacitive sensor 30 corresponds to the capacitive sensor 30 already described in connection with the first molding jaw 1 according to the invention.

Furthermore, the second molding jaw 1 according to the invention has a thermocouple 40. In contrast to the temperature sensor 10 described in connection with the first molding jaw 1 according to the invention, the thermocouple 40 is imprinted on the molding surface 2. The thermocouple 40 has a layer thickness of approximately 0.05 mm and clings to the molding surface 2 such that it follows the course of the molding surface 2 with its corrugation peaks 2a and corrugation valleys 2b. The thermocouple 40 has a pair of conductors made of conductive carbon black paint and conductive silver paint. The pair of conductors form the sensor head 41 at the junction thereof. The sensor head 41 of the thermocouple 40 comes into direct contact with the molten plastic tube to be molded and in the process measures its temperature contactlessly. More precisely, a thermoelectric voltage is measured, which is dependent on a temperature difference between the sensor head 41 and a reference junction.

The thermocouple 40 is connected to the data acquisition device 110 via an imprinted cabling 42. As shown in FIG. 2b, the imprinted cabling 42 runs on the connection surface 5b. The imprinted cabling 42 has a layer thickness of approximately 0.05 mm. Unlike the imprinted cabling 32 of the first molding jaw 1 according to the invention shown in FIG. 1c, the imprinted cabling 42 simultaneously ensures the connection of the thermocouple 40 to the data acquisition device 110 and the connection of the capacitive sensor 30 to the data acquisition device 110. In the case of the second molding jaw 1 according to the invention, an independent imprinted cabling 32 of the capacitive sensor 30 can therefore be dispensed with. The imprinted cabling 42 leads to a plug 43. This is identical to the plug 33 described above. Reference is therefore made to the detailed view shown in FIG. 1d and the above description in relation thereto.

Figure 3A:
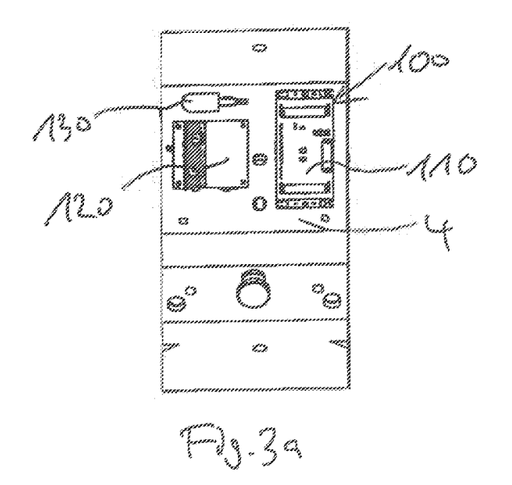

FIG. 3a shows a view of the outer surfaces 4 of a third molding jaw 1 according to the invention. Unlike the embodiment of the first and second molding jaws 1 according to the invention, the third molding jaw 1 according to the invention has no separate bracket 6 for the assembly 100. In the case of the third molding jaw 1 according to the invention, the individual components of the assembly 100 are instead arranged directly on one of the outer surfaces 4 of the molding jaw 1. The individual components of the assembly 100 are attached to the outer surface 4 in each case using attachment means, in particular using screws and/or adhesives. In the example shown, the assembly 100 again contains the data acquisition device 110, the W-LAN module 120 and the power supply device 130 as components. The functioning of the individual components is identical to the above description for the first and second molding jaws 1 according to the invention. Reference is therefore made to the above description.

Figure 3B:
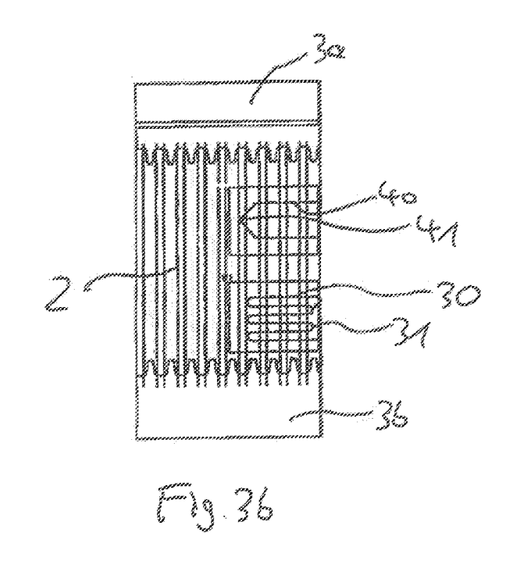
Figure 3C:
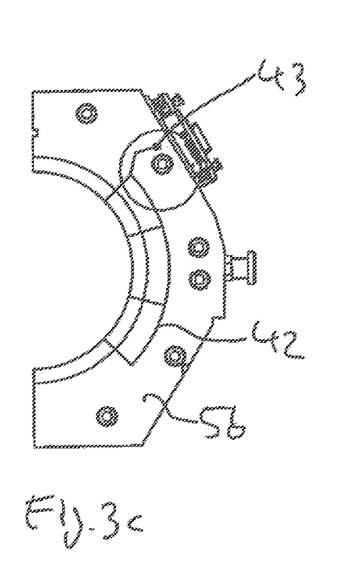

Otherwise the structure and functioning of the third molding jaw 1 according to the invention are identical to the second molding jaw 1 according to the invention. Views of the inner surfaces 3a, 3b with the molding surface 2 and of the connection surface 5b of the third molding jaw 1 according to the invention are shown in FIG. 3b and FIG. 3c, respectively. In particular, the third molding jaw 1 according to the invention again has only two sensors imprinted on the molding surface 2, namely a capacitive sensor 30 and a thermocouple 40. The structure, arrangement and functioning of the capacitive sensor 30 and of the thermocouple 40 are identical to the second molding jaw 1 according to the invention. Reference is therefore made here to the description of the second molding jaw 1 according to the invention. In the following, only the altered positioning of the plug 43 in the case of the third molding jaw 1 according to the invention is described.

Figure 3D:
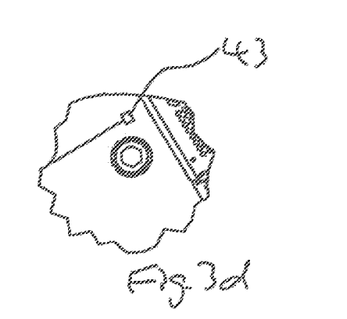

The detailed view of FIG. 3d shows the positioning of the plug 43 to which the imprinted cabling 42 again leads. A connection cable (not represented) inserted into the plug 43 completes the connection of the capacitive sensor 30 and of the thermocouple 40 to the data acquisition device 110.

The third molding jaw 1 according to the invention advantageously has a compact structure. The third molding jaw 1 according to the invention therefore has a comparatively low spatial demand and therefore reduces the design effort with respect to its movement along the molding path and with respect to its return after the molding path has been completely passed through.

Figure 4A:
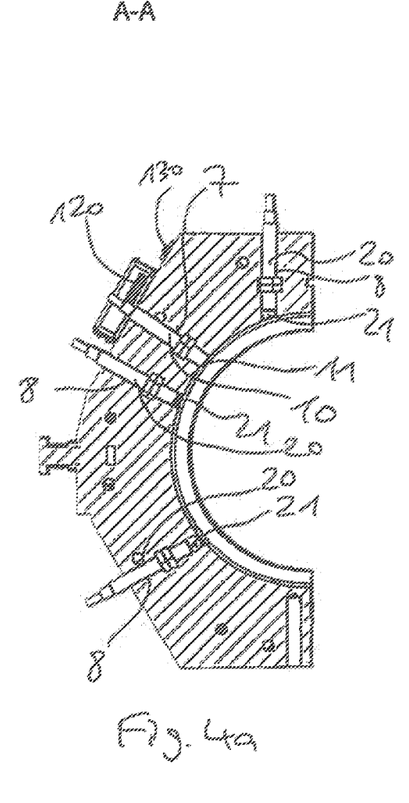
Figure 4B:
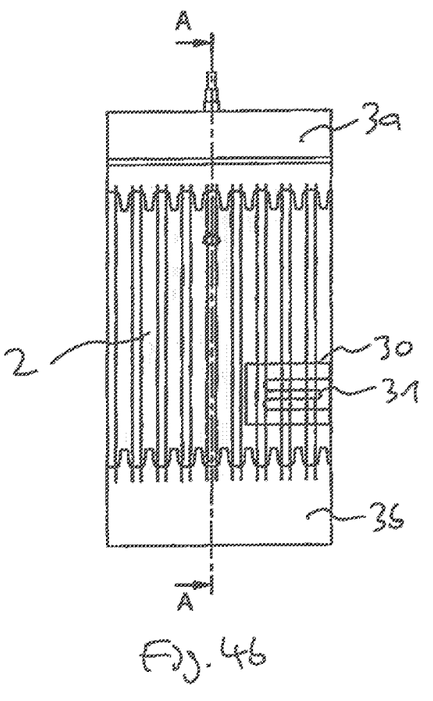
Figure 4C:
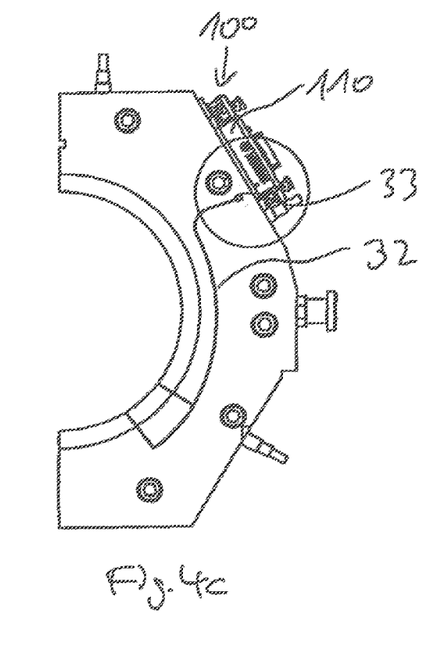
Figure 5:
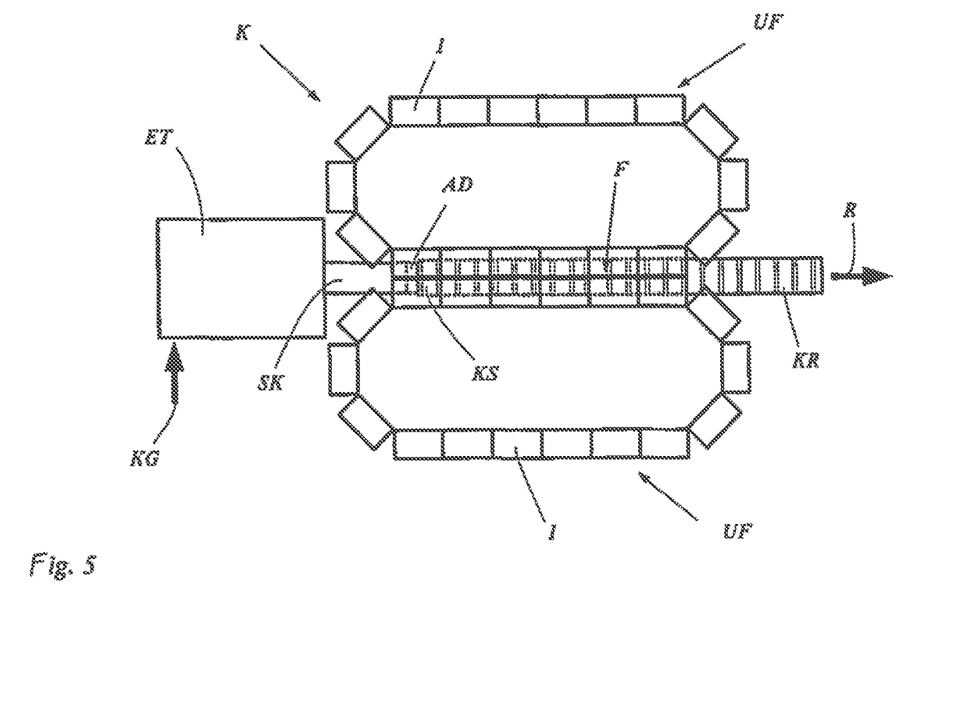

FIGS. 4a, 4b and 4c show a fourth molding jaw 1 according to the invention. The views correspond to FIGS. 1a, 1b and 1c in relation to the first molding jaw 1 according to the invention. The design of the fourth molding jaw 1 according to the invention also substantially corresponds to the first molding jaw 1 according to the invention. Reference is therefore made here to the description of the first molding jaw 1 according to the invention. Only the differences from the first molding jaw 1 according to the invention are described below.

Like the third molding jaw 1 according to the invention, the fourth molding jaw 1 according to the invention also has no separate bracket 6 for the assembly 100. In the case of the fourth molding jaw 1 according to the invention, the individual components of the assembly 100 are again arranged directly on one of the outer surfaces 4. Reference is made in this connection to the description of the third molding jaw 1 according to the invention.

In addition to the drilled hole 7 and the blind drilled hole 8, the fourth molding jaw 1 according to the invention has two further blind drilled holes 8. In the case of the fourth molding jaw 1 according to the invention, an ultrasonic sensor 20 is received in each of the total of three blind drilled holes 8 then present. The structure, arrangement and functioning of the respective ultrasonic sensors 20 are identical to the ultrasonic sensor 20 already described in the case of the first molding jaw 1 according to the invention. Reference is therefore made to the above description.

In the case of the fourth molding jaw 1 according to the invention, the three ultrasonic sensors 20 are in each case arranged at a distance from each other in the circumferential direction. The provision of several ultrasonic sensors 20 arranged in such a way makes it possible to determine a progression or a distribution of the wall thickness of the molten plastic tube to be molded or of the plastic pipe in the circumferential direction. As a result, the uniformity of the molten plastic tube to be molded or of the plastic pipe can be monitored and ensured by the molding jaw 1 during the entire molding process. The fourth molding jaw 1 according to the invention advantageously forms a molding jaw pair with a molding jaw correspondingly designed with several ultrasonic sensors 20, with the result that wall thicknesses can be determined over the entire circumference of the molten plastic tube or of the plastic pipe.

LIST OF REFERENCE NUMBERS molding jaw
molding surface
2a corrugation peak
2b corrugation valley
3a, 3b inner surfaces
4 outer surfaces
5a, 5b connection surfaces
6 bracket
7 drilled hole
8 blind drilled hole
10 temperature sensor
11 sensor head
20 ultrasonic sensor
21 sensor head
30 capacitive sensor
31 sensor head
32 imprinted cabling
33 plug
40 thermocouple
41 sensor head
42 imprinted cabling
43 plug
100 assembly
110 data acquisition device
120 W-LAN module
121 antenna
130 power supply device
AD discharge nozzle device
ET extruder
F molding path
K corrugator
KG plastic granules
KR plastic pipe
KS molten plastic tube
R production direction
SK injection head
UF molding jaws driven in a circulating manner

The invention claimed is:

1. A device for producing preferably corrugated plastic pipe from a molten plastic tube, comprising:
    an injection head for connection to an extruder, wherein the injection head is provided with a discharge nozzle device for the extrusion of the molten plastic tube, and
    several molding jaws, each having a molding surface for molding of the extruded molten plastic tube, which, for molding the extruded molten plastic tube, are arranged, each in pairs, guided by means of a drive device along a molding path in a production direction of the extruded molten plastic tube and are arranged to be returned by means of the drive device in a return device, wherein the molding jaws guided in pairs along the molding path, with their molding surfaces facing each other, form a receiving space for receiving the molten plastic tube, wherein
    at least one of the molding jaws has a sensor device which comprises at least one sensor with a data-capturing sensor head, which is arranged such that its capture area comprises an area of the molding surface and/or an area of the receiving space.

2. The device according to claim 1, wherein the sensor head or at least a section of the sensor head is arranged on the molding surface, or is arranged in the area of the molding surface inside the molding jaw or inside the receiving space.

3. The device according to claim 2, wherein the sensor head is imprinted at least in sections on the molding surface.

4. The device according to claim 2, wherein the sensor head is received in a bore hole which opens to the molding surface or in a recess communicating with the bore hole and formed in the molding surface.

5. The device according to claim 1, wherein the sensor head or at least a section of the sensor head is arranged at a distance from the molding surface inside the molding jaw or inside the receiving space.

6. The device according to claim 5, wherein the sensor head is arranged in a blind bore hole not breaking through the molding surface inside the molding jaw.

7. The device according to claim 1, wherein the sensor device has a data acquisition device for acquisition of data captured at the sensor head.

8. The device according to claim 7, wherein the data acquisition device comprises a data processing device and/or a data storage device, and/or in that the data acquisition device is connected to a data transmission device and/or a data display device and/or a power supply device.

9. The device according to claim 8, wherein the data acquisition device and/or the data transmission device and/or the data processing device and/or the data storage device and/or the data display device and/or the power supply device is immovably connected to the molding jaw which has the sensor device.

10. The device according to claim 1, wherein the sensor device has a data transmission device and/or a data processing device and/or a data storage device and/or a data display device and/or a power supply device and/or is connected to such a device or several such devices.

11. The device according to claim 10, wherein the data transmission device has a first section which, starting from the sensor, runs in a bore hole or in a blind bore hole.

12. The device according to claim 10, wherein the data transmission device comprises a second section which has a radio module.

13. The device according to claim 12, wherein the second section of the data transmission device and the communication device of the control system are designed for communication with each other.

14. The device according to claim 1, wherein the sensor provided in the sensor device is immovably connected to the molding jaw (1) which has the sensor device.

15. The device according to claim 10, wherein the data transmission device has a first section which, starting from the sensor, is imprinted, at least in sections in an area along the molding surface and/or in an area of a connection surfaces, and/or of one of the inner surfaces, and/or of one of the outer surfaces of the molding jaw.

16. The device according to claim 1, wherein the sensor device comprises a temperature sensor, and/or an ultrasonic sensor, and/or a pressure sensor and/or a capacitive sensor as the at least one sensor.

17. The device according to claim 1, wherein several sensor heads are arranged each spaced apart from the other in a circumferential direction in the area of the molding surface.

18. The device according to claim 1, wherein the molding jaws are each formed in the manner of a profile body with the molding surface running in an axial direction, two connection surfaces running in a radial direction and several outer surfaces running in the axial direction.

19. The device according to claim 18, wherein two inner surfaces adjoin the molding surface.

20. The device according to claim 1, wherein the device comprises a control system, and in that the control system has a communication device.

21. The device according to claim 20, wherein the communication device further comprises a radio module.

22. The device according to claim 1, wherein the molding surface is corrugated.

23. A molding jaw for producing a plastic pipe from a molten plastic tube, comprising:

a molding surface; and a sensor device which comprises at least one sensor with a data-capturing sensor head, which is arranged such that it has a capture area comprising an area of the molding surface and/or an area of a receiving space.

24. A molding jaw pair formed of two molding jaws, each molding jaw comprising a molding surface, and a sensor device which comprises at least one sensor with a data-capturing sensor head, which is arranged such that it has a capture area comprising an area of the molding surface and/or an area of a receiving space, wherein the two molding surfaces of the two molding jaws each having the sensor device complement each other, forming a substantially cylindrical inner surface.

25. The molding jaw pair according to claim 24, wherein several sensor heads are arranged distributed over an entire circumference of the inner surface each in the area of the molding surface and each spaced apart from each other in the circumferential direction.

* * * * *